Jan. 22, 1957 R. W. STERRETT 2,778,088
MANUFACTURE OF ROOFING SLABS AND THE LIKE
Filed Dec. 23, 1950 6 Sheets-Sheet 1
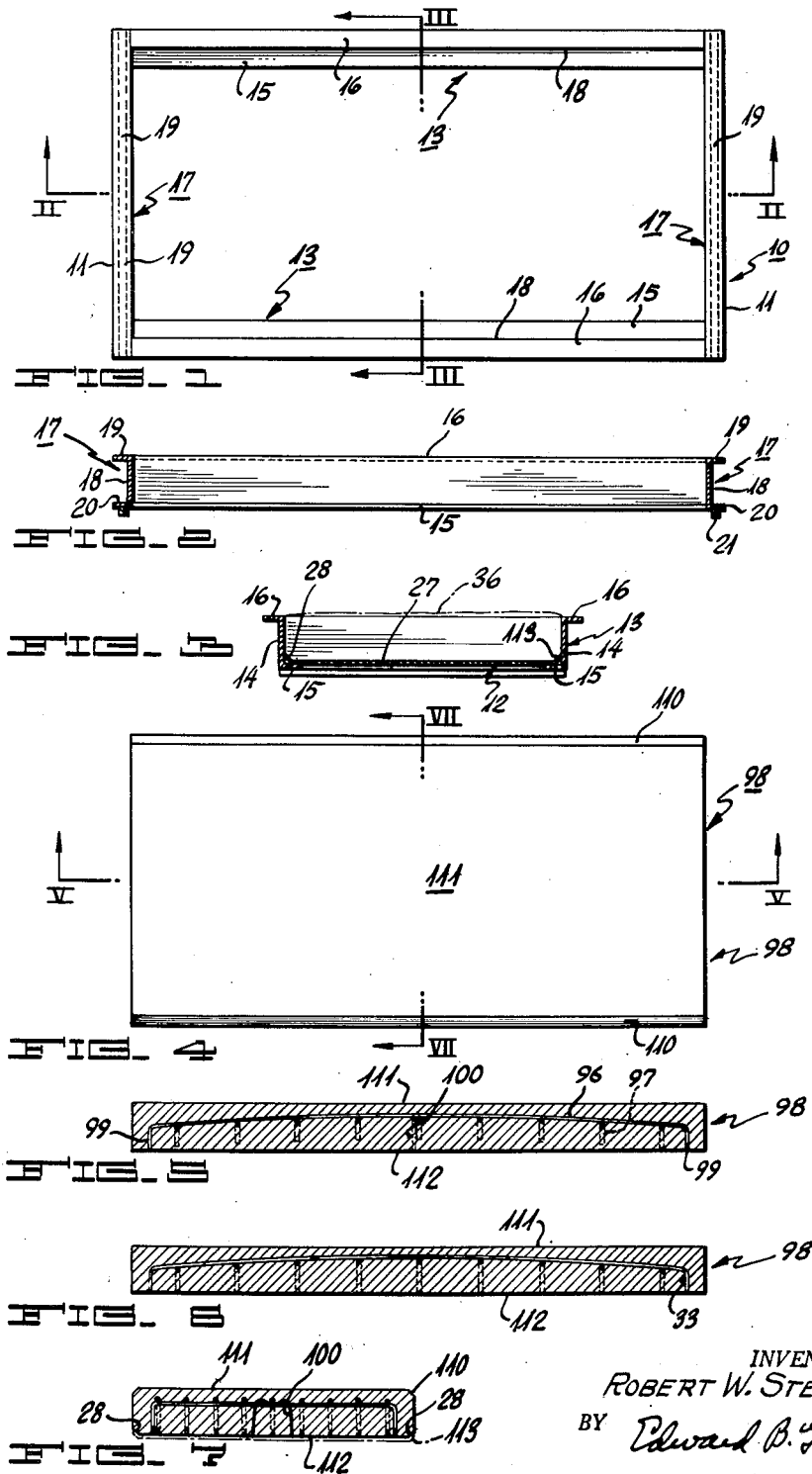
INVENTOR.
ROBERT W. STERRETT
BY Edward B. Gregg
ATTORNEY

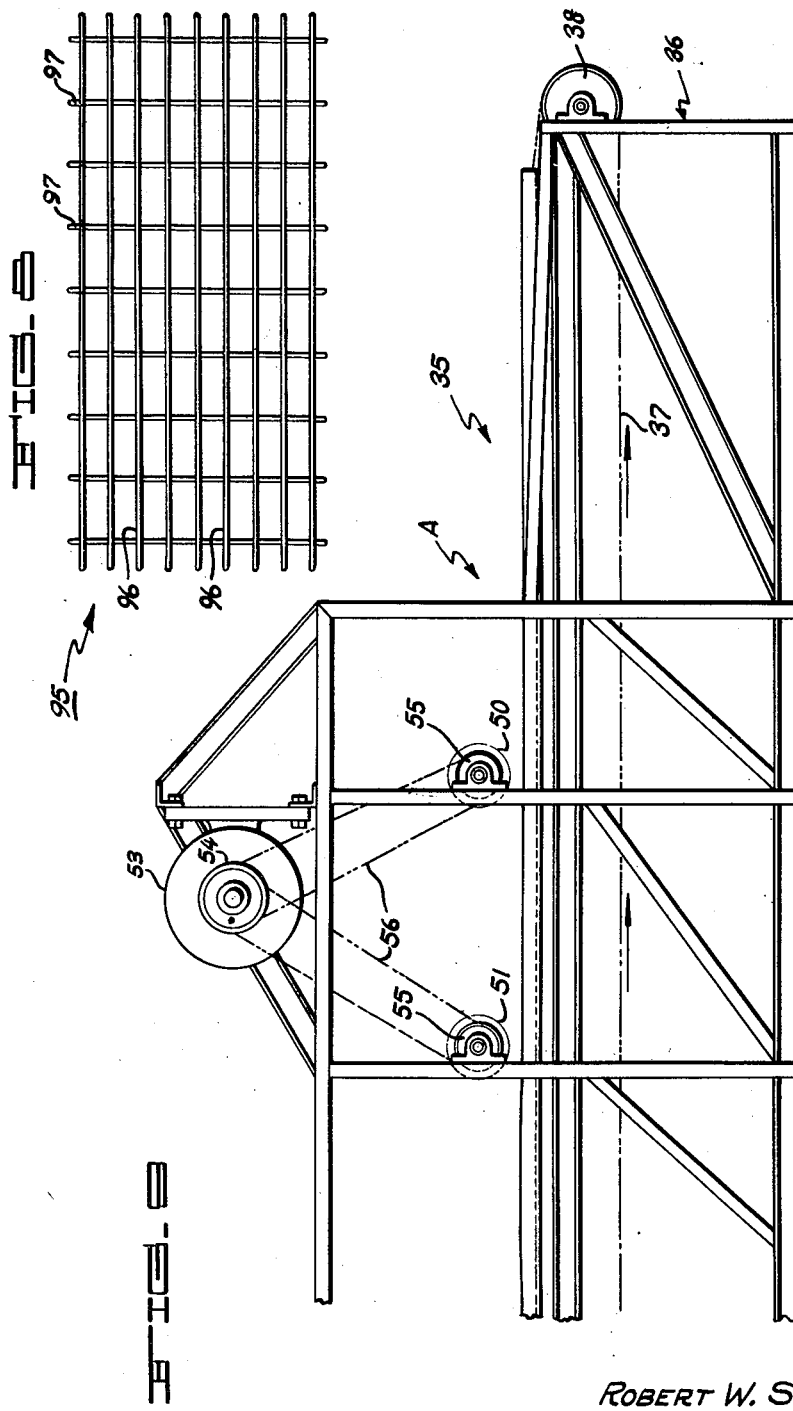

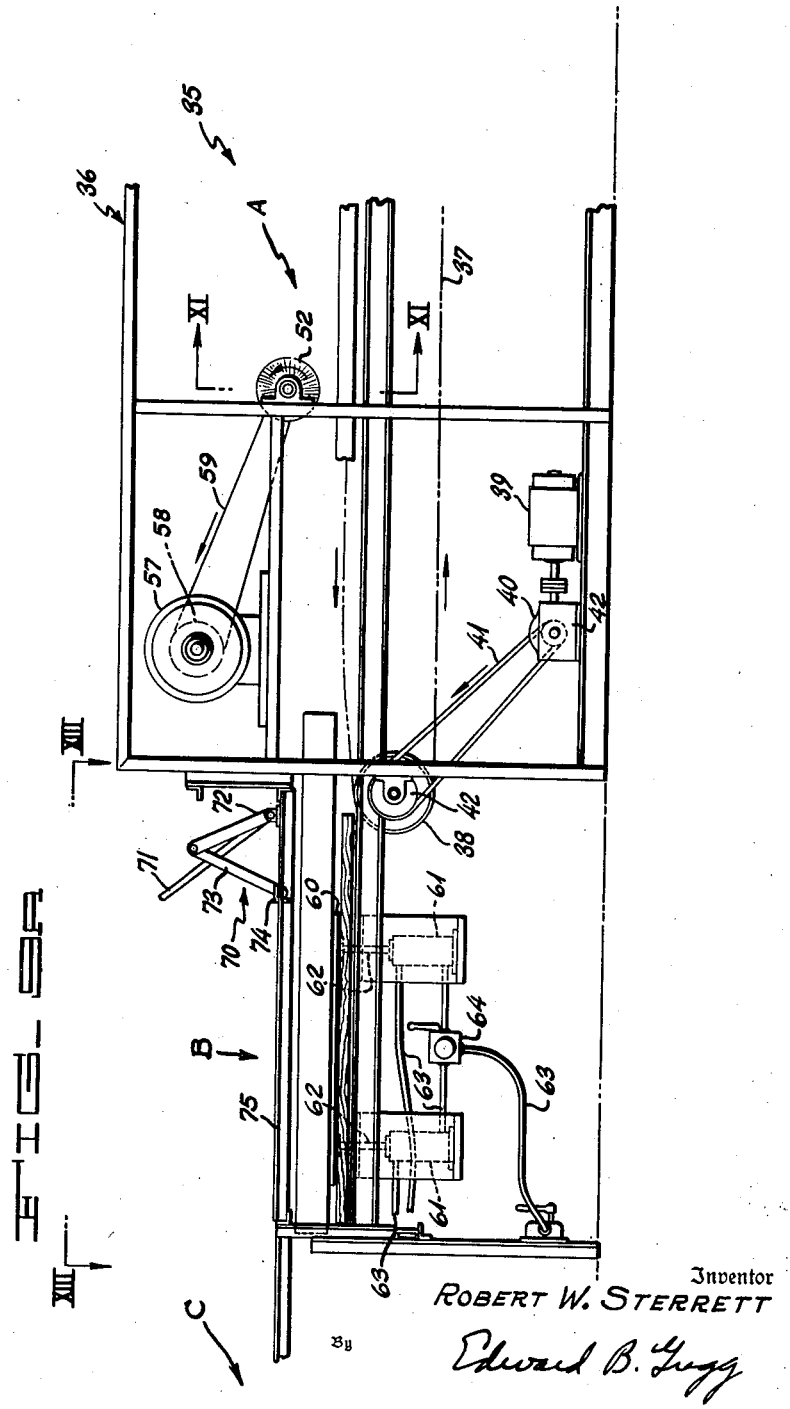

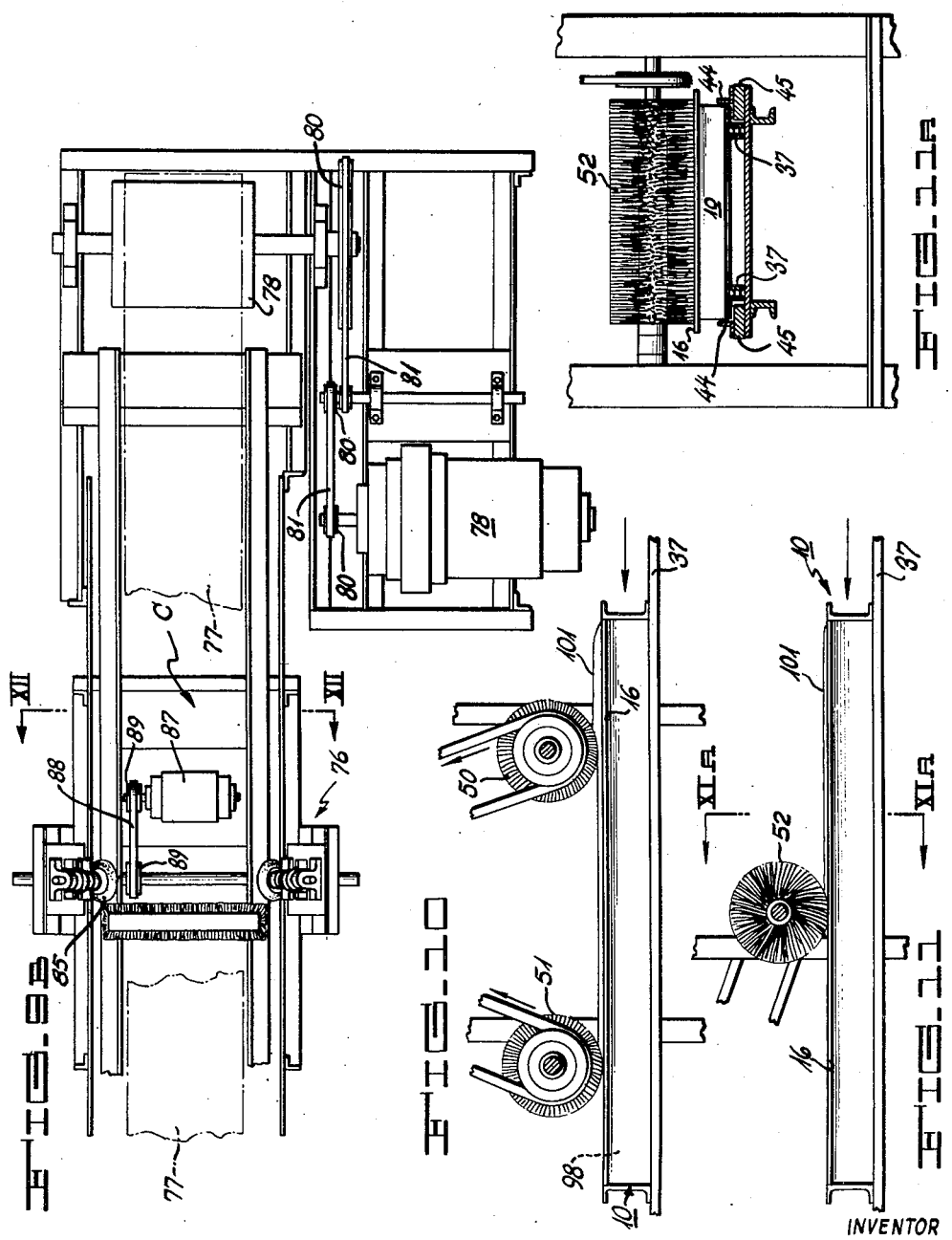

Jan. 22, 1957 — R. W. STERRETT — 2,778,088
MANUFACTURE OF ROOFING SLABS AND THE LIKE
Filed Dec. 23, 1950 — 6 Sheets-Sheet 5
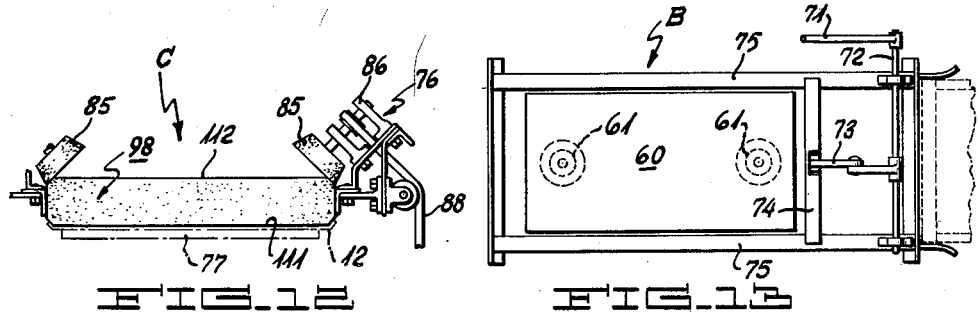
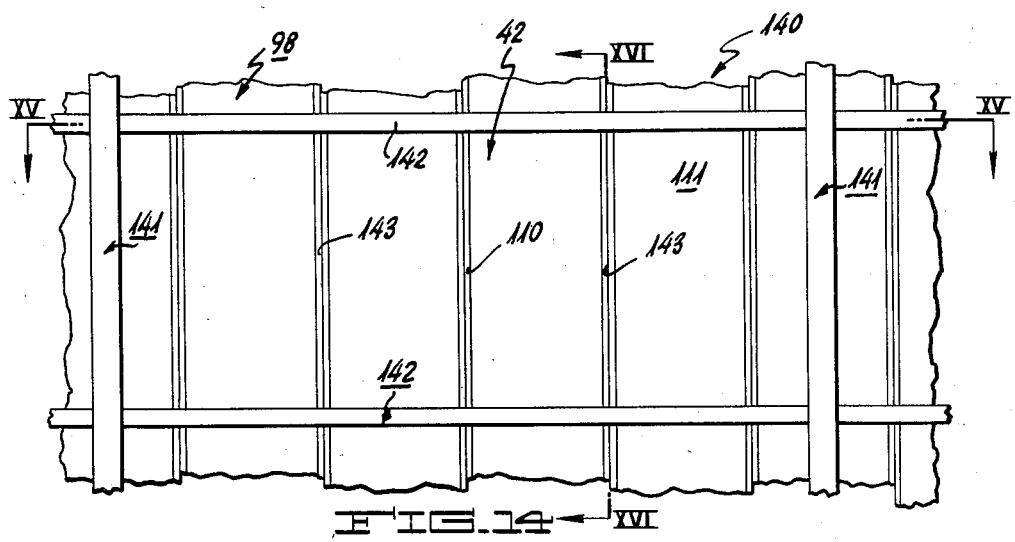
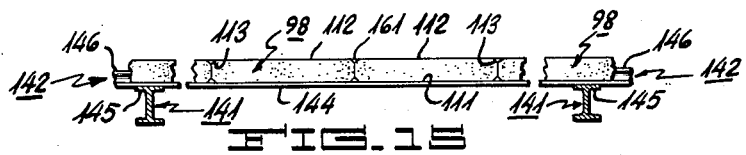
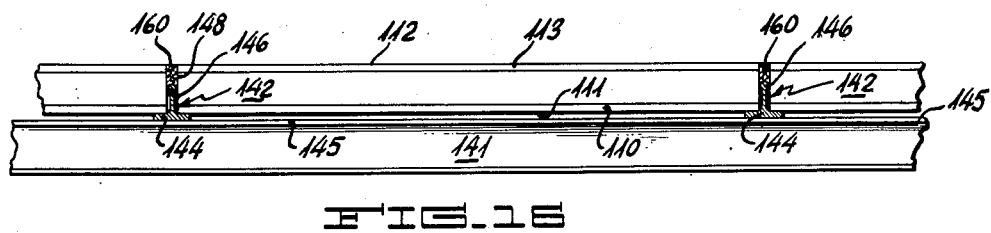
Inventor
ROBERT W. STERRETT
By Edward B. Gregg
Attorney

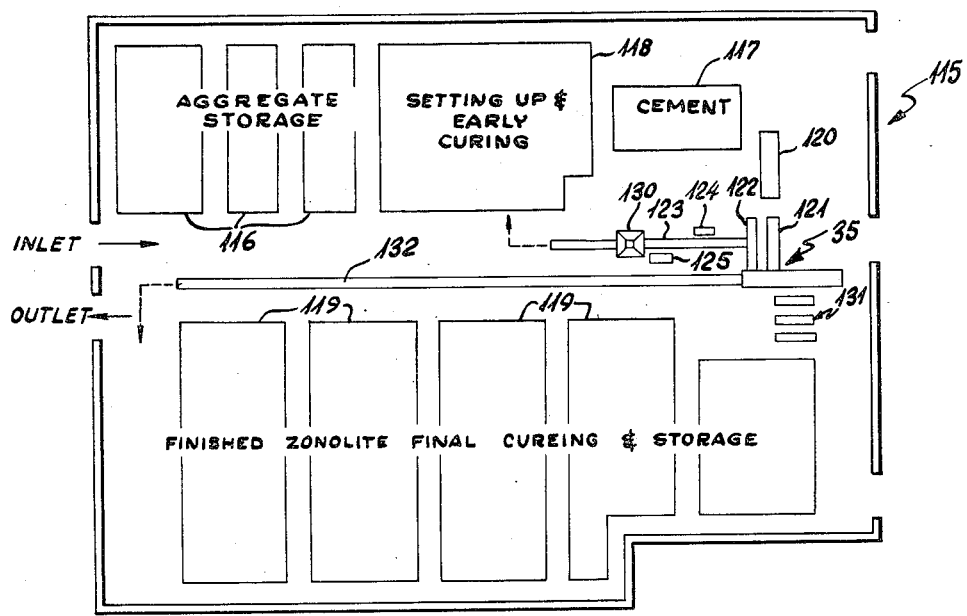
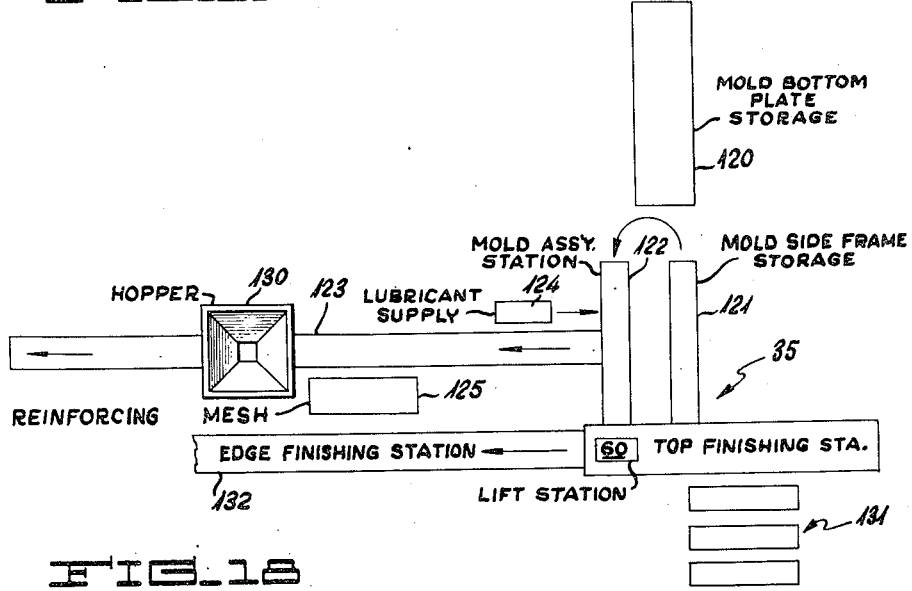

United States Patent Office 2,778,088
Patented Jan. 22, 1957

2,778,088

MANUFACTURE OF ROOFING SLABS AND THE LIKE

Robert W. Sterrett, Atlanta, Ga., assignor to Southern Zonolite Company, Atlanta, Ga., a corporation of Georgia Application December 23, 1950, Serial No. 202,504

3 Claims. (Cl. 25—154)

This invention relates to process and apparatus for manufacturing roofing slabs and the like and to a novel form of roofing slab and the like.

More particularly this invention relates to a method and to apparatus for manufacturing lightweight, reinforced, insulating concrete slabs suitable for roofing and other similar purposes. The method and apparatus are intended for continuous, large-scale, economic operation and to produce slabs having requisite structural properties, a nicely finished appearance and accurate, uniform dimensions.

Roofing slabs and other similar building units can be prefabricated by preparing a mix of an aggregate, an hydraulic cement and water, casting the fluid mix in suitable molds, allowing it to set and cure and then removing the cured slabs from the molds. Prefabrication of this character is advantageous because it can be carried out at a central plant with attendant advantages of large equipment, the purchse of large quantities of material, skilled and specialized personnel, etc. However, certain difficulties have been encountered in practice which militate against the prefabrication of slabs of this character.

For example, in removing slabs from their molds, they frequently crack due to stresses and strains occasioned by the process of removal. Such cracks, even if they do not adversely affect the strength of the slabs, nevertheless detract from their appearance.

A further difficulty inherent in prior production techniques for prefabrication of concrete slabs resides in the fact that, in accordance with prior practice, that face of the slab which is intended to be exposed in the final structure is adjacent the bottom of the mold. There is a legitimate reason for this mode of operation; the bottom of the mold can be finished to the desired degree of perfection and contour and will, according to theory, impart to the adjacent face of the slab the desired finished appearance and contour. In practice, however, when the slab is removed from the mold, the surface exposed to the mold bottom will crack and/or small pieces of the slab will adhere to the mold bottom. An unsightly appearance results, which can be remedied only by subjecting the slab, after removal from the mold, to a suitable finishing treatment. This, of course, will add substantially to the cost of production.

It is, therefore, an object of the present invention to provide improved apparatus and improved procedure for the prefabrication of concrete slabs and the like for roofing and other construction purposes.

It is a further object of the invention to provide improved apparatus and procedure, of the character and for the purpose described, which obviate certain of the disadvantages which have been encountered in prior practice.

Yet another object of the invention is to provide procedure and apparatus of the character and for the purpose described which are capable of producing concrete building slabs and the like on a mass production basis, having precise and uniform dimensions and having a finished surface for exposure in the final structure, said surface being attractive and devoid of cracks and other unsightly disfigurations.

Another object is to provide an improved mold capable of forming slabs and of cooperating with finishing equipment to finish the slab, and which is so constructed that cured or partially cured slabs can be readily removed without breakage, cracking and the like.

A further object is to provide an assembly of equipment, including molds and finishing machinery, and a technique for operating the same, which lend themselves to mass production methods and continuity of operation and provide an end product consisting of uniform, precisely dimensioned, structural units having an attractive appearance.

Another object is to provide slabs of the character described and, more particularly, lightweight insulating slabs, which are of precise dimensions, which have an attractive exposed surface (i. e., a surface intended to be exposed to view in the final structure, such as a roof or ceiling), which are reinforced by a steel mesh or the like, and in which the reinforcing steel is spaced from the exposed surface so that unsightly rust spots will not develop on said surface.

These and other objects of the invention will be apparent from the ensuing description and the appended claims.

Certain forms and embodiments of the invention are illustrated by way of example in the accompanying drawing and are described in detail hereinafter.

In the drawings:

Figure 1 is a top plan view of one form of mold employed in accordance with the invention. In this view only the side frame is shown, the bottom plate being removed.

Figure 2 is a longitudinal section along the line II—II of Figure 1.

Figure 3 is a transverse section along the line III—III of Figure 1. In this view the bottom plate is shown in transverse section.

Figure 4 is a top plan view of a finished slab constructed in accordance with the invention, and it shows the finished, beveled surface thereof which is intended to be exposed in the final structure.

Figure 5 is a longitudinal section taken along the line V—V of Figure 4.

Figure 6 is a view similar to that of Figure 5 but showing an alternative form of reinforcing mesh.

Figure 7 is a transverse section taken along the line VII—VII of Figure 4.

Figure 8 is a top plan view of one form of reinforcing mesh employed in accordance with the invention.

Figures 9, 9A and 9B are views of the finishing machine of the invention, Figure 9A being a continuation of Figure 9 and Figure 9B being a continuation of Figure 9A. Figure 9 and 9A are in side elevation and Figure 9B is in top plan.

Figure 10 is a fragmentary view showing the first and second finishing brushes in end elevation and on a larger scale than that of Figure 9.

Figure 11 is a similar view of the third finishing brush. In both Figures 10 and 11 a slab is shown in its mold and as being subjected to the operation of the finishing brushes.

Figure 11A is a section taken along the line XIA—XIA of Figure 11.

Figure 12 is a view taken along the line XII—XII of Figure 9B, but on a larger scale, showing a slab on its bottom mold plate and as being subjected to the action of the edge-finishing grinding wheels.

Figure 13 is a top plan view, taken along the line XIII—XIII of Figure 9A, of the lift mechanism.

Figure 14 is a fragmentary bottom view of a roof showing the steel framework thereof and several slabs constructed in accordance with the invention, the said slabs being laid in place over the steel framework.

Figure 15 is a section taken along the line XV—XV of Figure 14; i. e., along a joint between a row of slabs.

Figure 16 is a fragmentary section taken along the line XVI—XVI of Figure 14.

Figure 17 is a diagrammatic layout of a plant for manufacturing building slabs in accordance with the invention, and with the equipment illustrated in Figures 1 to 13.

Figure 18 is a diagrammatic view of a portion of the plant layout of Figure 17 and is shown on a larger scale.

Referring now to the drawings and more particularly to Figures 1, 2 and 3, a mold 10 is illustrated including a side-and-end framework 11, hereinafter referred to as the side frame, and a bottom plate 12. The bottom plate is shown only in Figure 3. As illustrated, the sideframe 11 is of rectangular, oblong shape and of suitable dimensions, having in mind the end use of slabs. For the particular use described hereinafter, the side frame 11 has inside dimensions of 36 inches by 18 inches, but these dimensions will, of course, vary according to circumstances and preferences, and the side frame may have a different shape; e. g., it may be square, or hexagonal or rounded.

The preferred side frame 11 specifically shown comprises parallel, steel side members 13 of S-shaped cross section, each having a vertical portion or web 14, an inwardly extending bottom plate-supporting flange 15, and an outwardly extending accurately finished top guide flange or gauging member 16. The side frame 11 also comprises channel shaped steel end members 17, each having a vertical portion or web 18, a top flange 19 and a bottom flange 20. Feet 21 are also provided, being welded or otherwise suitably secured to the bottom flanges 20 of the end members 17. The feet 21 allow the molds to be stacked on one another when they contain slabs, without contact between the slab of one mold and the bottom of another mold.

The mold bottom plate 12 consists of a flat body portion 27 and beveled edges 28. As shown in Figure 3, the bottom plate 12 rests on the bottom support flanges 15 of the side members 13.

The mold 10, including the side frame 11 and the bottom plate 12 may be constructed of steel or any other suitable material of construction and is preferably accurately formed and machined. The dimensions of the bottom plate 12 are preferably such that it will fit within the side frame 11, can be easily inserted therein and removed therefrom, and will prevent fresh concrete mix from leaking. It is especially important that the top guide flanges or gauging members 16 be accurately finished, to be perfectly smooth and to lie in the same horizontal plane. The significance of this feature will be made apparent hereinafter.

Referring now to Figures 9, 9A and 9B, the finishing machine is there shown in side elevation and the lifting portion is shown in top plan in Figure 13. It includes a top-finishing station A, a lifting station B and an edge-finishing station C. The machine, which is generally designated as 35, comprises a stationary framework 36 supporting an endless conveyor including chains 37 which are led over sprockets 38 and are driven by means of a motor 39, a speed-reducer 40, a V-belt 41 and pulleys 42. The conveyor chains 37 are provided with dogs or other suitable pusher means (not shown). A trackway (best shown in Figure 11A) is provided in the form of parallel angle members 44 and wooden slide members 45. A plurality of finishing brushes 50, 51 and 52 are provided, each of which is journaled in suitable bearings fixed to the framework. The brushes 50, 51 and 52 are set successively closer to the slide members 45. The first two brushes, 50 and 51, are driven by a motor 53 through the medium of pulleys 54 and 55 and V-belts 56, and the third brush is driven by a motor 57 through the medium of a pulley 58 and a V-belt 59.

Referring to Figures 9A and 13, at the lifting station B a lifting platform 60 is provided which is operated hydraulically by means including hydraulic cylinders 61, rods 62, fluid pressure lines 63, and a valve 64. A slab pusher 70 is provided for a purpose explained hereinafter, and it comprises a lever 71 for operating a shaft 72 which is suitably journaled in the framework of the machine, a jointed pusher rod 73 fixed at one end to the shaft 72 and a pusher member 74 fixed to the other end of the pusher rod 73 and guided for horizontal movement by rails 75.

Referring to Figures 9B and 12, to the left of the lift station B as viewed in Figures 9A and 9B and at the edge-finishing station C, there is provided an edge-finishing assembly 76 including a conveyor belt 77 led over pulleys 78 (only one of which is shown). The pulleys 78 and the conveyor belt 77 are driven by means including a motor 79, pulleys 80 and V-belts 81. The edge-finishing assembly also includes a pair of frustoconical beveling wheels 85, each journaled in a bracket 86 and driven by means of a motor 87, a V-belt 88 and pulleys 89. The beveling wheels are best shown in Figure 12.

In operation, the mold side frames 11 and their bottom plates 12 are assembled and are filled with a suitable concrete mix, e. g., a mix of expanded vermiculite or other light-weight porous aggregate, Portland cement and water. Preferably a reinforcing mesh is employed such as shown at 95 in Figure 8. This mesh, which may be made of steel wire, includes parallel longitudinal wires 96 and parallel transverse wires 97 welded, soldered or otherwise secured to the longitudinal wires.

Referring to Figure 5, in which one form of mesh is shown embedded in a concrete slab which is designated by the numeral 98, the mesh 95 is provided with feet 99 formed by turning down the ends of the wires, and it is given the curvature of a reverse catenary to resist tension in the finished slab. In the form of mesh shown in Figure 5, only the end feet 99 touch the bottom plate 12 of the mold, hence contact the lower face of the slab 98, while in the form of mesh shown in Figure 6, all of the feet touch the bottom plate 12 and the lower face of the slab. In either form of mesh, as shown in Figure 7, a wire chair 100 may be provided for supporting the mesh at its mid-portion during pouring of fresh concrete mix and prior to setting of the mix.

As stated, the molds 10 and mesh reinforcements 95 are assembled and the molds are filled with fresh concrete mix in sufficient excess to form a hump 101 (see Figure 10). In the preferred embodiment of the invention, the freshly filled molds are set aside to allow the fresh slabs to set and partially cure. This early curing period is of sufficient duration that the slabs are form-sustaining and will not fracture during the finishing operations to which they are subjected, but it is of sufficiently short duration that the slab will not develop a high degree of hardness and be unduly resistant to the finishing operations.

The partially cured slabs, while still in their molds, are then transported to the finishing machine 35, are placed on the slides 45 and are transported by the chains 37 to the top finishing station A.

Referring to Figure 10, it will be seen that the brushes 50 and 51 operate to abrade the top surface of the slab and thereby reduce the hump or excess 101, but not quite to the level of the gauging flanges 16 of the mold 10. The third and last brush 52 operates to finish the top surface of the slab precisely to the level of the gauging flanges 16. It will be seen from an inspection of Figure 11A that the third and last brush 52 overlaps the flanges 16 of the molds and cannot, therefore, abrade the slabs below the flanges 16. The brush 52 is, however, rotated sufficiently rapidly and is powered sufficiently that it will cut or abrade the slabs 98 down to the level of the flanges 16. Provision may be made, by means well-known in the art, for lowering the brushes 50, 51 and 52 as they are worn away, and they can be easily replaced by new brushes whenever necessary.

It will, therefore, be apparent that a means has been provided for continuously operating upon slabs carried by molds to finish the exposed or top surface of each of the slabs to precise shape and dimensions.

Referring now to Figure 9A, after the mold 10 and slab 98 have left the last or third brush 52 and the top surface of the slab has been accurately finished, the mold and the slab are deposited on the lifting platform 60. This platform is of somewhat smaller dimensions than the mold bottom plate 12 so that it will freely pass through the mold side frame 11. The purpose of the lifting platform 60 is to separate the slab 98, while it is still supported on the mold bottom plate 12, from the mold side frame 11. This is readily accomplished, without fracturing the slab, for the reasons more fully explained hereinafter. The valve 64 is operated to lift the platform 60, and with it the mold bottom plate 12 and the slab 98, to the level of the conveyor belt 77 of the edge-finishing assembly 76. The slab pusher 70 is then operated, by means of the lever 71, to push the slab 98 and its bottom plate 12 to the left as viewed in Figure 9A, so as to deposit the slab and mold bottom plate on the conveyor belt 77. The valve 64 is then operated to retract the platform 50, the side frame 11 is removed, and the lift platform is then in readiness for the next mold and slab.

The slab, supported by its mold bottom plate 12, is next carried by the conveyor belt 77 to the beveling station C where the beveling wheels 85 operate to bevel the long edges of the slab, as shown in Figure 12.

As shown in Figures 4 to 7, the finished slab 98 has an oblong shape, beveled long edges 110, an accurately finished and decorative surface 111 and an unfinished or rough surface 112 adjacent the mold bottom plate 12. By reason of the upturned edges 28 of the mold bottom plate 12, the slab also has beveled edges 113 along the rough surface 112.

Referring now to Figures 17 and 18, there is shown diagrammatically a plant layout for casting, finishing and curing slabs of the character described. As shown, a suitable building 115 is provided having an appropriate materials inlet and exit, and within the building 115 are provided suitable storage facilities or space at 116 for the aggregate, at 117 for the cement at 118 for setting up and early curing and at 119 for final curing and storage of the finished slabs. The mold bottom plates 12 are stored at 120 and the mold side frames 11 at 121. These are assembled at 122 in the manner described above and illustrated in Figure 3. The assembled molds are placed on a conveyor 123 and are conveyed past a lubricant supply 124 to lubricate the sides and bottoms of the molds. A supply of reinforcing mesh 95 is maintained at 125, and one mesh is inserted in each of the molds. The molds then pass underneath a hopper 130 containing fresh concrete mix, which is poured into each mold as it passes underneath. A suitable screeding knife (not shown), or other means well-known in the art, may be provided for scraping excess concrete mix from the molds, leaving, however, sufficient excess to form a slight hump such as shown at 101 in Figure 10. The filled molds are then transported, as indicated by the broken line, to the area 118 and are there stored and allowed to remain, under suitably controlled atmospheric conditions if desired, for setting up and early curing. As explained above, this early curing period is of sufficient duration that the slabs 98 are form-sustaining and have strength sufficient to withstand transporting and the finishing operations and to be lifted from the mold side frames 11. However, the early curing period is of sufficiently short duration that the slabs are still relatively soft compared to the completely cured slabs, thereby facilitating the abrading and finishing processes to which the slabs are subjected.

After the slabs have been subjected to suitable early curing, they are transported in convenient numbers to a storage area 131 adjacent the finishing machine 35. The slabs are finished on this machine as described in detail hereinabove. The empty mold side frames 11 are removed to the storage area 121. The finished slabs are conveyed on their bottom plates 12 along an exit conveyor 132, which may be an extension of the conveyor belt 77. They are lifted from the conveyor 132, are separated from the bottom plates 12 (which are returned to the storage area 120) and are placed on pallets (not shown) and transported to the area 119 for final curing and storage.

Referring now to Figures 14, 15, and 16, the finished slabs 98 may be employed to provide a roof covering or deck for a roof structure such as shown at 140 in Figure 14. The roof structure 140, as illustrated, comprises main beams 141 which, as shown in Figure 16, are I-beams, and cross members 142. The slabs 98 are laid on top of this steel framework in side-by-side, adjoining relation to one another with their finished surfaces 111 facing down, hence exposed, and their unfinished surfaces 112 facing up, hence unexposed. As shown in Figure 14, which is a bottom view of the roof structure, the beveled edges 110 along the long sides of the slabs 98, form attractive parallel V-shaped grooves 143. As shown in Figures 15 and 16, the cross beams 142 are T-members and have their bases 144 welded or otherwise secured to the upper flanges 145 of the main beams 141. When the slabs 98 have been thus laid in place and are supported by the bases 144 of the cross members 142, it will be apparent that a space 148 is provided between adjoining ends of the slabs along each cross member 142, which is filled with grout as shown at 160. As shown in Figure 15, the beveled edges 113 of the rough surfaces 112 of the slabs 98 provide grouting grooves to receive grout 161.

It will thus be apparent that apparatus and method have been provided for producing slabs or other similar structural units, such apparatus and method having the following, among other, advantages:

The method lends itself to rapid production of slabs on a large-scale, mass production basis with continuity of operation. As stated hereinabove, in conventional methods of prefabricating slabs, concrete mix is poured into a mold or form, and the finished surface, by which is meant that surface which is intended to be exposed to view, is that portion of the slab adjacent the bottom of the mold. As has been explained, this mode of operation is disadvantageous. Thus, when the slab is separated from the mold bottom, a certain amount of fracturing and/or adhesion of the slab to the mold bottom is bound to occur. This, of course, detracts from the appearance of the finished surface, and, when high standards of inspection are in force, necessitates a subsequent finishing operation on the slab after removal from the mold. This adds greatly to the cost of manufacture. With the method and apparatus of the present invention, this difficulty is obviated by finishing the upper surface of the slab while it is still in the mold.

Not only does this mode of operation obviate the difficulties mentioned above, but it is adaptable to continuous, mass production operation. As stated, the molds are filled with an excess of fresh concrete mix and are set aside for early curing and setting up. The early curing is carried to a point where the slab has set and has acquired sufficient strength to be form-sustaining and to resist stresses and strains imposed thereon in subsequent operations. The early curing, however, in the preferred form of the invention, is not carried to a point where the slabs have acquired the hardness of the fully cured product. This facilitates the finishing operations, including both the top finishing operation with the brushes 50, 51 and 52 and the beveling operation with the beveling wheels 85.

Another important advantage is derived from the fact that the mold side frames 11 not only provide support for the slabs as they pass through the finishing machine, but the accurately formed side flanges 16 thereof act as gauges to gauge the bite of the finishing brush 52, preventing it from biting too deeply into the surface of the slab. The slab is not only nicely finished on one surface but is also finished to precise dimensions. It will be apparent that, by using a finishing brush having a concave or convex shape, the slabs can be finished to provide a face having a convex or concave shape, respectively.

Another important advantage is derived from the form and structure of the mold and, in particular, the bottom plate 12 thereof. As described above and as shown in the drawings, more particularly in Figure 3, the mold bottom plate 12 is formed with upturned or beveled edges 28 along both of its long sides. Experience has demonstrated that, if the bottom mold plate 12 is perfectly flat, when it is lifted out of the side frame 11 by the lifting platform, some of the slabs 98 will crack or fracture at least to the extent of marring the appearance of the finished product. I have found, however, that by upturning the side edges and, if desired, the end edges of the mold bottom plate, this difficulty is obviated. The upturned edges provide sufficient lateral support for the slab during the critical operation of lifting the slab from the side frame, to prevent fractures.

Another advantage of the apparatus and method of the invention is the provision of a plurality of rotating brushes to accomplish the abrading action in several steps, and wherein the last brush finishes the upper surface of the slab to the desired degree. If desired, a screeding knife may be substituted for the last brush 52, or for all of the brushes, but in practice this is less advantageous because of the development of hair line cracks in the finished surfaces 111 of the slabs. The employment of a rapidly rotating and sufficiently powered finishing brush obviates this difficulty.

As indicated hereinabove, the material employed to form the slabs 98 may be any type of concrete having the property of setting somewhat gradually over a period of time. The invention is applicable to prefabrication of slabs and the like from concrete mixes formed by means of a suitable aggregate, any hydraulic cement binder and water. It is especially advantageous in connection with lightweight insulating slabs wherein the aggregate is a lightweight aggregate such as expanded vermiculite, perlite, pumice, haydite, or the like. The invention is particularly well suited to this type of material, which does not develop quite the hardness of concrete employing a dense aggregate, such as sand or gravel. The softer qualities of lightweight concretes lend themselves more readily to the finishing operations. The invention is, however, applicable to concrete slabs formed with water, Portland cement and sand, gravel or other similar dense aggregate. It is also applicable to concretes in which gypsum acts as the binder.

The finished slabs, especially those formed from a lightweight aggregate such as expanded vermiculite or perlite and reinforced with a reinforcing mesh such as shown at 95, are advantageous because of their lightweight, insulating properties, their attractive appearance, the speed and economy with which they can be produced, the uniformity of product and the ease with which they can be laid in place. The lightweight slabs do not have the structural strength of slabs formed with denser aggregates, such as sand or gravel, but they possess a very substantial degree of strength which is quite adequate for many structural uses. Another advantageous feature of the slab is, that the reinforcing mesh is spaced from the finished surface 111. Thus, rust spots caused by corrosion of the exposed portions of the mesh, are confined to the rough surface 112. This exposure is of little consequence, because the surface 112 is not exposed to view.

I claim:

1. A continuous method of manufacturing lightweight building slabs and the like, which comprises providing a mold including a removable bottom having at least two opposite edges turned upwardly to provide lateral support for a slab in the mold and a side frame, said side frame having guide edges along opposite sides thereof, providing a reinforcing mesh with depending leg members and placing said mesh within said mold with the leg members resting upon said bottom and supporting the mesh in spaced relation below said guide edges, casting a slab in said mold about said reinforcing mesh to embed the same in said slab and to fill said mold above said guide edges, allowing partial curing of the slab to occur, abrading away the entire top surface of the partially cured slab extending above said guide edge with a rotating brush, and exerting upward pressure on the bottom surface of said bottom plate to lift said bottom plate and with it the slab to remove the same from the side frame, and beveling the top edges of said slab.

2. A continuous method of manufacturing lightweight building slabs and the like, which comprises providing a mold including a removable bottom plate and a side frame, said side frame having guide edges along opposite sides thereof, providing a reinforcing mesh with depending leg members and placing said mesh within said mold with the leg members resting upon said bottom and supporting the mesh in spaced relation below said guide edges, casting a slab in said mold about said reinforcing mesh to embed the same in said slab and to fill said mold above said guide edges, allowing partial curing of the slab to occur, abrading away the entire top surface of the partially cured slab extending above said guide edge, and exerting upward pressure on the bottom surface of said bottom plate to lift said bottom plate and with it the slab to remove the same from the side frame, and beveling the top edges of said slab.

3. A continuous method of manufacturing lightweight building slabs and the like, which comprises providing a mold including a removable bottom plate and a side frame, said side frame having guide edges along opposite sides thereof, providing a reinforcing mesh with depending leg members and placing said mesh within said mold with the leg members resting upon said bottom and supporting the mesh in spaced relation below said guide edges, casting a slab in said mold about said reinforcing mesh to embed the same in said slab and to fill said mold above said guide edges, allowing partial curing of the slab to occur, abrading away the entire top surface of the partially cured slab extending above said guide edge, and exerting upward pressure on the bottom surface of said bottom plate to lift said bottom plate and with it the slab to remove the same from the side frame.

References Cited in the file of this patent

UNITED STATES PATENTS

| Number | Name | Date |
|---|---|---|
| 867,852 | Switzer et al. | Oct. 8, 1907 |
| 1,109,070 | Hunt | Sept. 1, 1914 |
| 1,601,812 | Cristiani | Oct. 5, 1926 |
| 1,604,411 | Herrold et al. | Oct. 26, 1926 |
| 1,627,266 | Beale | May 3, 1927 |
| 1,945,003 | Smolak et al. | Jan. 30, 1934 |
| 1,953,434 | Saffert | Apr. 3, 1934 |
| 1,987,874 | Stees | Jan. 15, 1935 |
| 2,230,880 | Brown | Feb. 4, 1941 |
| 2,234,114 | Gifford | Mar. 4, 1941 |
| 2,258,553 | Hartley | Oct. 7, 1941 |
| 2,295,155 | Brown et al. | Sept. 8, 1942 |
| 2,320,728 | Hume | June 1, 1943 |
| 2,388,880 | Stitt | Nov. 13, 1945 |
| 2,458,564 | Cooper | Jan. 11, 1949 |
| 2,470,650 | Russell | May 17, 1949 |
| 2,494,212 | Spriggs et al. | Jan. 10, 1950 |
| 2,522,116 | Hayes | Sept. 12, 1950 |
| 2,531,016 | Waechter | Nov. 21, 1950 |